United States Patent [19]

Johannessen

[11] 3,889,263
[45] June 10, 1975

[54] RADIO-FREQUENCY PULSE GENERATION SYSTEM AND METHOD

[75] Inventor: Paul R. Johannessen, Lexington, Mass.

[73] Assignee: Megapulse Incorporated, Bedford, Mass.

[22] Filed: Nov. 15, 1973

[21] Appl. No.: 415,970

[52] U.S. Cl. .................... 343/103; 331/49; 331/165
[51] Int. Cl. ............................................. G01s 1/20
[58] Field of Search ............ 343/103; 331/165, 166, 331/49; 328/61

[56] References Cited
UNITED STATES PATENTS

| | | | |
|---|---|---|---|
| 2,995,709 | 8/1961 | Beardwood III, et al. | 331/165 |
| 3,017,580 | 1/1962 | Phillips | 331/166 |
| 3,458,816 | 7/1969 | O'Brien | 343/103 |

Primary Examiner—Maynard R. Wilbur
Assistant Examiner—Richard E. Berger
Attorney, Agent, or Firm—Rines and Rines; Shapiro and Shapiro

[57] ABSTRACT

This disclosure is concerned with radio-frequency pulse generation, as for Loran type navigation transmissions and the like, wherein the transmitted pulse is generated by causing a pair of opposite poled half-cycle pulse generators to impulse-excite a tuned coupling network and antenna (or other load), the transfer function characteristics of which are adjusted to yield the desired pulse shape, with the complete cycle resulting from the pair of pulse generator half-cycles controlling, for example, the first two half cycles of the leading edge of the antenna pulse current, and the network and antenna characteristics controlling the remaining half cycles.

20 Claims, 6 Drawing Figures

Fig. 1.

RADIO-FREQUENCY PULSE GENERATION SYSTEM AND METHOD

The present invention relates to radio-frequency (RF) pulse generation systems and methods, being more particularly directed to high power transmitting systems of the Loran type requiring the generating and controlling of RF pulses of critical predetermined shape and phase characteristics.

Navigation transmissions, such as Loran type radio-frequency pulses and similar RF pulsing applications, require a precisely controlled leading edge and a predetermined pulse shape that have been generated by a myriad of techniques including pulse sequential generating circuits (U.S. Pat. Nos. 2,786,132 and 3,243,728, for example), magnetic pulse compression sequential inverter techniques (as, for example, in my copending applications, Ser. No. 171,174, filed on or about Aug. 12, 1971, now U.S. Pat. No. 3,786,334, for Magnetic Pulse Compression Radio-Frequency Generator Apparatus and Method, now U.S. Pat. No. 3,786,334, granted Jan. 15, 1974, and Ser. No. 173,827, filed on or about Aug. 23, 1971), now U.S. Pat. No. 3,711,725, granted Jan. 16, 1973 and by other types of pulse-shaping networks. Such techniques, however, are subject to the disadvantage of complexity and the difficulty of facile phase coding or other adjustment. Other output summing or combining techniques are disclosed in, for example, U.S. Pat. Nos. 3,708,739 and 2,614,246.

Underlying the present invention, however, is the discovery that through the appropriate critical use of a pair of pulse generators, used to excite an appropriate network the impulse response characteristics of which approximates the desired pulse shape, one pulse generator generating a positive half-cycle of current and the other a negative half-cycle, highly simplified and accurate adjustment and timing can be achieved to produce a complete cycle of RF current, with phase coding readily adjustable for the above-described and related purposes. An object of the invention, therefore, is to provide a new, improved and vastly simplified radio-frequency pulse generation system and method particularly adapted for Loran type navigation or related usages.

A further object is to provide such a novel method and system of pulse generation that is more generally applicable, as well.

Other and further objects will be explained hereinafter and are more fully delineated in the appended claims. While the invention will hereinafter be described in connection with the preferred and illustrative example of Loran type navigation transmissions, it is to be understood that the circuits and techniques herein disclosed are also applicable to other systems wherein the same type of advantages are desired. In summary, however, from one of its important aspects, the invention embraces a method of generating radio-frequency pulses of predetermined pulse shape, that comprises, generating a positive half-cycle of radio frequency current, generating a negative half-cycle of such radio-frequency current, adjusting the timing of such generating to produce a resultant complete cycle of said radio-frequency, applying said complete cycle to impulse-excite a network coupled to a load, and adjusting the network and load to provide a resultant transfer function characteristic yielding upon excitation by a cycle of said radio-frequency current a load pulse of substantially the predetermined pulse shape, the said complete cycle controlling the first half cycles of the leading edge of the load pulse current and the said network and load characteristic controlling the remaining half cycles thereof. Preferred details are hereinafter presented.

The invention will now be described in connection with the accompanying drawings, FIG. 1 of which is a block diagram illustrating basic components of a system operating in preferred form in accordance with the method of this invention, particularly adapted for the illustrative example of Loran type transmissions;

FIGS. 2 (a) and (b) are waveform diagrams illustrating the format of the illustrative Loran pulse application of the invention;

Figure 1:
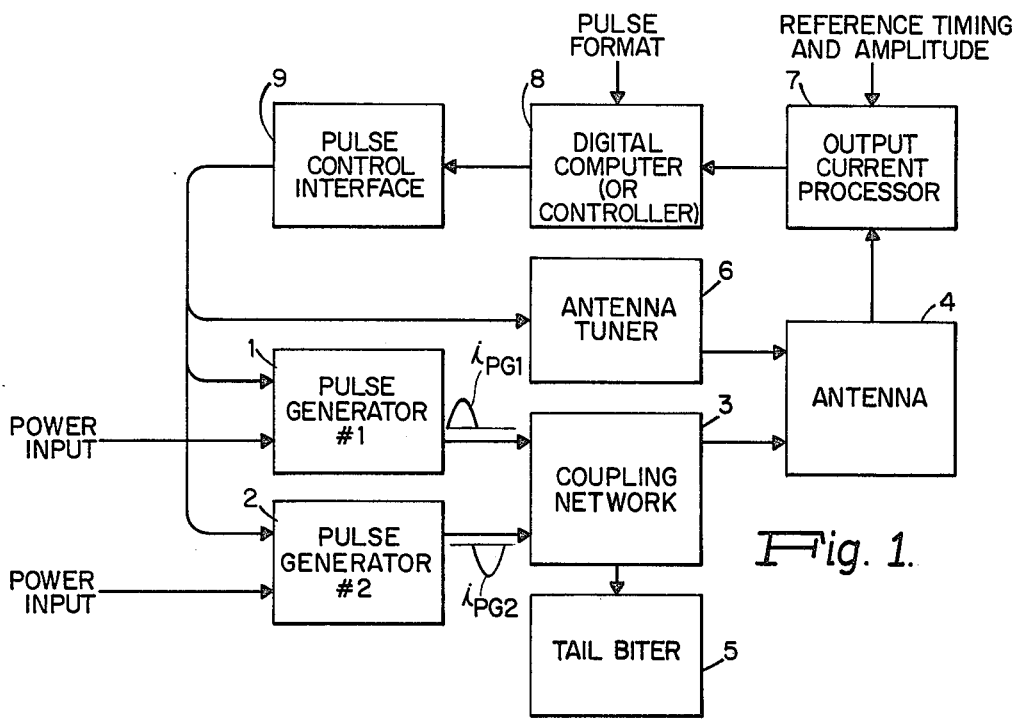

Referring to the block diagram of the exemplary RF pulse transmitting system shown in FIG. 1, the desired RF pulse shape is generated by impulse excitation of a network the impulse response of which approximates to the desired pulse shape. In order to obtain phase coding, two pulse generators are employed, as illustrated at 1 and 2. Pulse generator 1 generates a positive half-cycle of current, $i_{PG1}$, and pulse generator 2 generates a negative half-cycle of current, $i_{PG2}$. By adjusting the timing of the output current pulses, one complete cycle of RF current can be obtained. By starting pulse generator 1 ahead of pulse generator 2, moreover, a positive cycle is generated; and by starting pulse generator 2 ahead of pulse generator 1, a negative cycle is generated. Thus, by reversing the timing of the output pulses, phase coding may be readily and simply obtained.

To generate the desired RF pulse shape, a coupling network 3 is connected between the two pulse generators 1 and 2 and the load, such as an antenna 4. The transfer function characteristics of the combination of antenna 4 and coupling network 3 is designed to approximate as closely as possible to the transfer function that would yield the desired antenna-current pulse shape when excited by a cycle of RF current. To obtain good cycle identification for navigation purposes, as before mentioned, it is important that the leading edge of the RF pulse envelope be precisely controlled; whereas the tail of the RF pulse is not so critical. The coupling network 3, therefore, is designed primarily to obtain the desired leading edge, with the required modification of the tail of the RF pulse effected by the later-described tailbiter circuit 5.

Since the antenna parameters vary with atmospheric conditions, such as temperature, humidity and wind velocity, it is necessary continuously to tune the antenna, as at 6, to insure that the RF antenna current frequency is constant and of the desired value (i.e. 100 kHz for Loran C and D). In existing Loran transmitting systems, such as vacuum tube, transistor, or SCR sequential inverter type transmitters, before discussed, precise antenna tuning is not so important because the transmitter has active control of the leading edge antenna current frequency. In the RF pulse transmitter of the present invention, however, as applied to the illustrative Loran mode, the two pulse generators 1 and 2 control only the first two half-cycles of antenna current. The characteristics of the coupling network 3 and antenna 4 control the remaining half-cycles of the leading edge.

Precise control of the RF pulse parameters, such as timing and amplitude, is done by means of an output current processor circuit 7, a digital computer or controller 8, and a pulse control interface circuit 9, later described.

Figure 2:
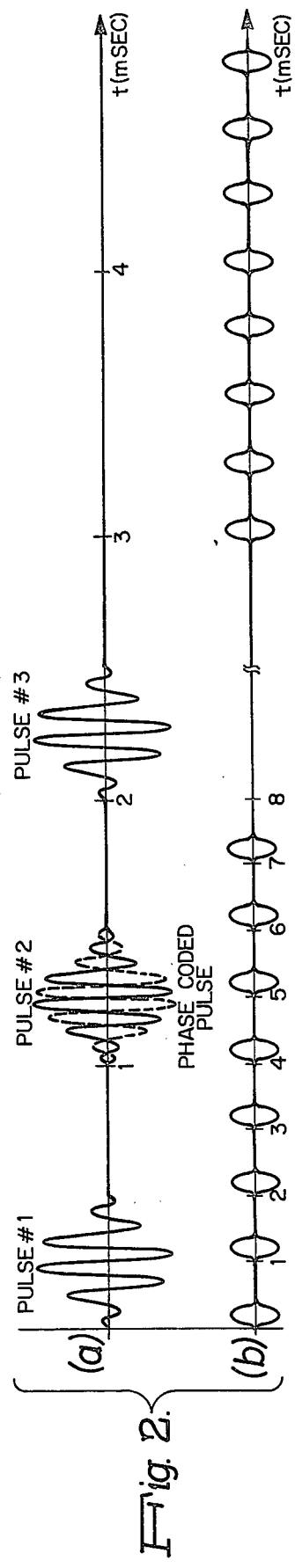

The Loran C pulse format is shown in FIG. 2, with the RF pulses, more clearly shown in enlarged scale FIG. 2(a), being transmitted in groups of eight pulses, FIG. 2(b), and with the distance between each pulse in a group being about 1 m sec, and the distance between groups varying approximately from 0.04 to 0.1 sec. Loran D, however, uses 16 pulses per group, the distance between each pulse in a group being 0.5 m sec., and the distance between groups varying approximately 0.04 to 0.05 sec. Each group of pulses is phase coded, as illustrated in FIG. 2(a). A typical phase code is $+ \pm - \pm + \mp + \mp \pm$. The plus sign indicates zero degree carrier phase, the minus sign indicates 180° carrier phase, and the $\pm$ or $\mp$ indicates that the pulses alternate in phase between + and − or − and + from group to group, as shown. Because of the phase coding and the pulse group format, pulse generation systems of this type tend to have jitter in both amplitude and time, and pulse droop during the group interval. This jitter and droop can be prevented by making the two pulse generators 1 and 2 substantially identical and by using very stiff power supplies. This approach, however, is extremely expensive. The transmitting system of this invention, it has been found, can indeed use moderately stiff power supplies and can tolerate approximately 10% variation in the two pulse generator parameters without degrading system performance. This property has been obtained by means of a time-multiplexed digital control system. In the block diagram of FIG. 1, this time-multiplexed digital control is performed by means of the digital computer 8, though special purpose digital circuits designed specifically for this operation can equally well be used. In a transmitting system of this type, however, a small general purpose digital computer is often required to perform other functions, such as fault detection and isolation, monitoring functions, and communication functions.

The time-multiplexed control system 8 basically works as follows. Because of phase coding, there are two groups of pulses which may be identified as Group A and Group B. A typical phase code of these groups is: Group A: $+ + - - + - + - +$, and Group B: $+ - - + + + + + -$. The pulse parameters, amplitude, phase and frequency of all pulses are measured by the output current processor 7, and this information is fed to the digital computer 8 (or digital controller) which is programmed to keep track of each pulse in the two-phase coded groups (A and B). For example, if there are eight pulses per group, then there are sixteen registers that store phase (or pulse timing) information, and another sixteen registers that store amplitude information. But only one register is required to store frequency information, since the carrier frequency depends only upon the coupling network 3 and antenna parameters, and these parameters are all independent of pulse format.

The computer 8 then performs normal control operations such as integration, differentiating, averaging, etc. on each set of pulse data, and generates the required control signals at 9 for the two pulse generators 1 and 2. Thus, the computer performs the operation of seventeen timeshared feedback loops (eight for phase, eight for amplitude and one for frequency) to control phase, amplitude and frequency of the antenna current pulses.

Figure 3:
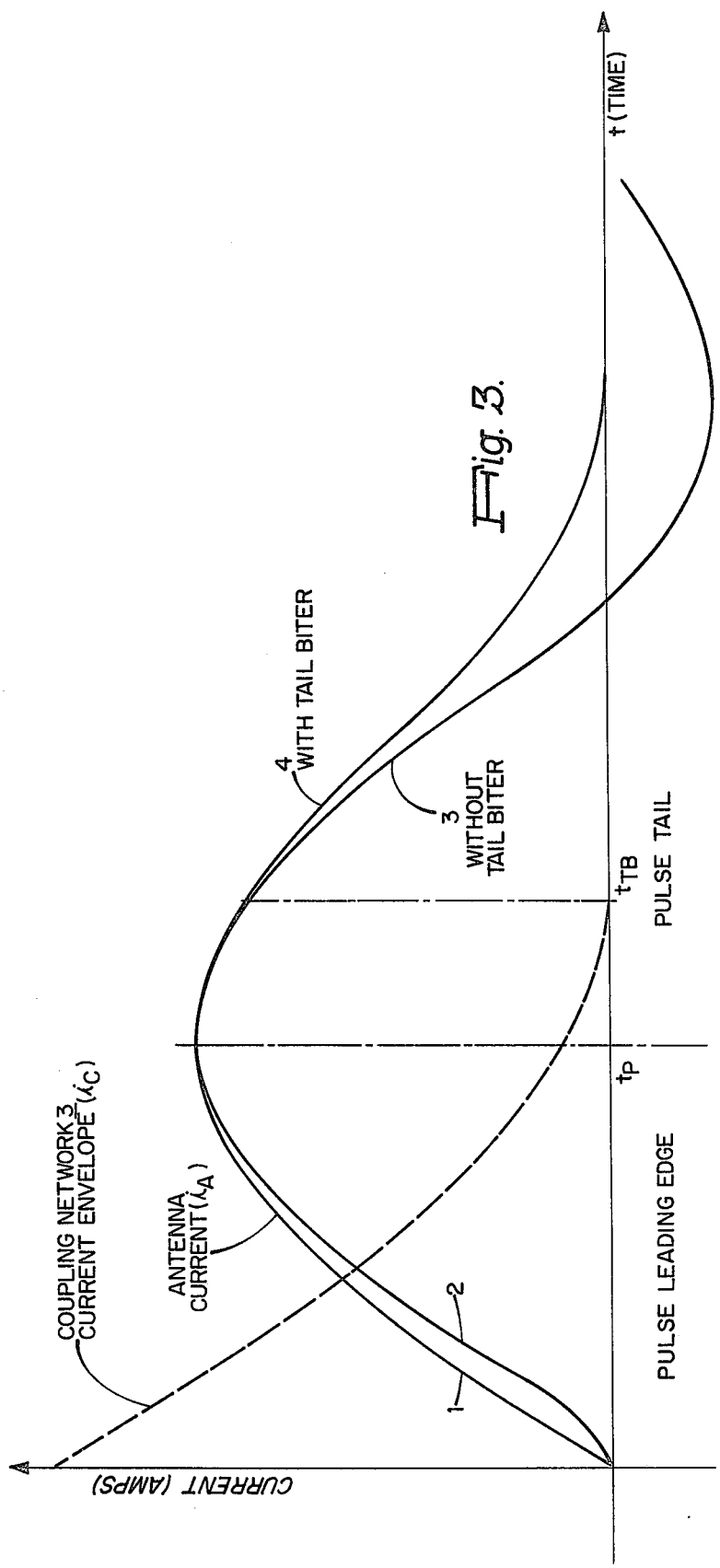

For navigation purposes, it is important, moreover, that the pulse leading edge envelope is the same for all transmitting stations. In the transmitting system of the invention, the shape of the pulse leading edge is determined by the coupling network 3 and the antenna characteristics. So long as the same coupling network 3 and antenna 4 are used for each station, therefore, the pulse envelope is the same for each station, having the desired shape of the leading edge envelope shown in FIG. 3. Curve (1) of FIG. 3 is a typical cosine waveform, while curve (2) is of the form $$t^c e^{-\alpha t},$$

where $c$ may take any value between 1 and 2. These two curves represent the two boundaries of acceptable envelope shapes of the leading edge.

Figure 4:
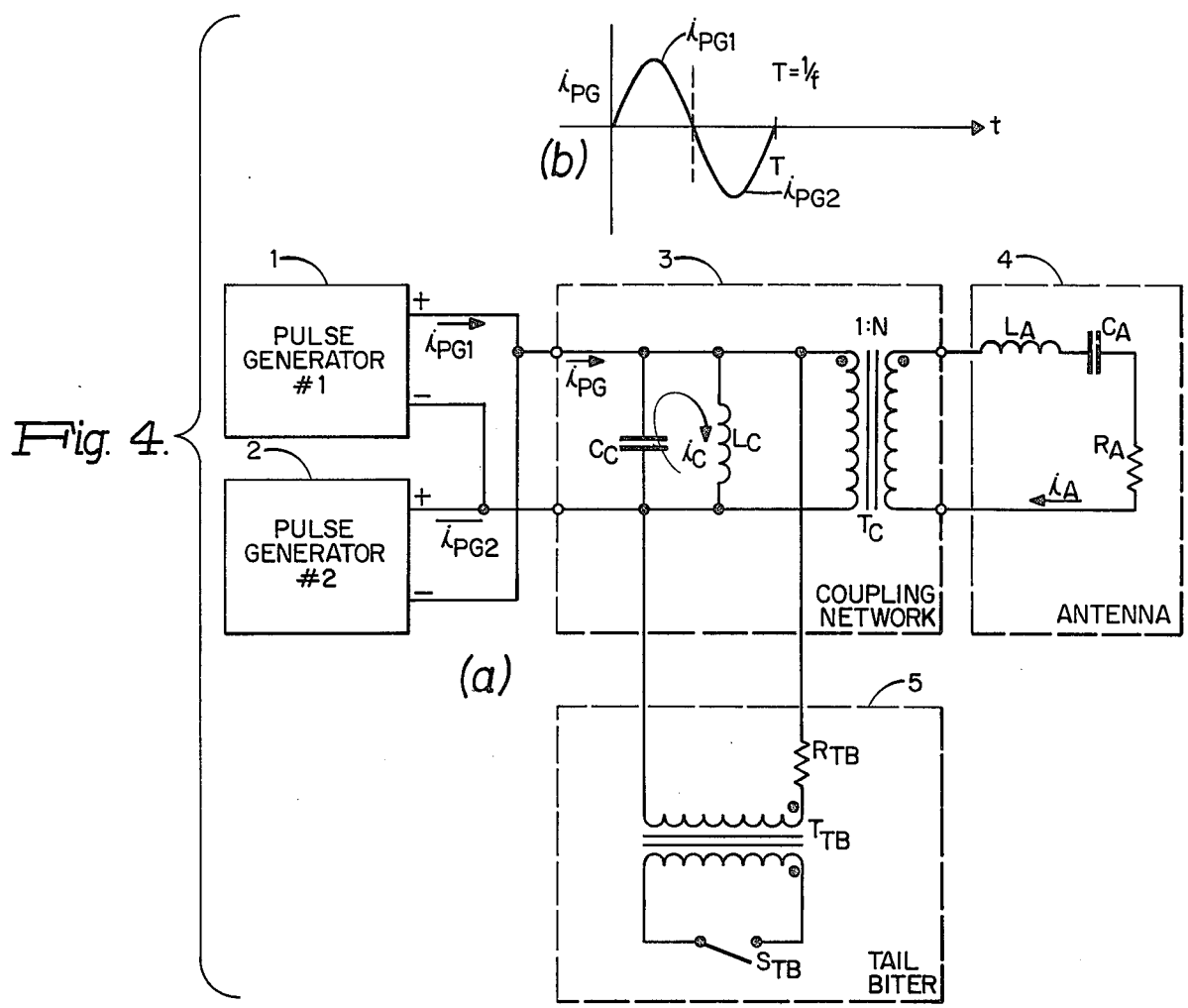
FIG. 4(a) is a circuit diagram of a preferred single tuned coupling network component suitable for the system of FIG. 1.
FIG. 4(b) is a waveform illustrative of the performance thereof.

Curve (1) can be obtained by the simple coupling network 3 shown in FIG. 4. This coupling network consists of a parallel tuned network, $L_c$ and $C_c$, and a matching transformer $T_c$, the parallel tuned network being tuned to the RF carrier frequency; i.e. 100 kHz for Loran C and D. The antenna 4 is shown in FIG. 4 as comprising the effective series elements $L_A$, $C_A$ and $R_A$. Curve (2) and curves lying between (1) and (2) of FIG. 3, moreover, can be obtained by the multiple tuned network of FIG. 5, later described.

Another important requirement of the RF pulse is that the zero crossings of the antenna current should occur at equidistant intervals, typically 5 $\mu$sec for Loran C and D. When exciting a coupling network of this type with a pair of current pulses, however, it has been found that phase modulation of the antenna current usually results which gives rise to antenna current zero-crossings that have nonuniform zero-crossing intervals. This phenomenon is illustrated in the waveform graph of FIG. 6 wherein curve (1) has the desired uniform zero-crossings, while curves (2) and (3) are phase modulated. Curve (2), for example, starts out with too wide zero-crossing intervals that gradually decrease to the desired value during the leading edge of the pulse. Curve (3), on the other hand, starts out with too narrow zero-crossing intervals that gradually increase to the desired value.

In accordance with the present invention, in the circuit of FIG. 4, such phase modulation is avoided by tuning the coupling network 3 and the antenna 4 to exactly the desired RF frequency, and by exciting the network 3 with one complete sine-wave of current of the same frequency as the desired RF frequency. This sine-wave of current at $i_{PC}$ is shown in FIG. 4(b), and is generated by the two half-cycle pulse generators 1 and 2 of the FIGS. 1 and 4(a).

During the first cycle, most of the energy delivered to the coupling network 3 is stored in the tuned circuit comprising $L_c$ and $C_c$, with only a small amount of energy transferred to the antenna 4. The envelope of the coupling network current $i_c$ is shown by the dotted curve of FIG. 3. During the generation of the leading edge, the energy in the coupling network 3 transfers to the antenna 4 such that the coupling network current $i_c$ decreases, while the antenna current $i_A$ increases, as illustrated in FIG. 3. By changing the turns ratio N of the coupling transformer $T_c$, FIG. 4, the rate of energy transfer can be adjusted between these coupled circuits; an increase in N decreasing the rate of energy transfer, while a decrease in N increases the rate of energy transfer. In this manner, the time-to-peak $tp$ (FIG. 3), can be adjusted from approximately one cycle of the RF carrier to a large number of cycles depending upon the losses in the coupling and antenna circuits.

In most transmitting systems of the Loran or similar types, the antenna losses are quite small so that the energy oscillates back and forth between the coupling network 3 and the antenna 4. This condition results in a pulse-tail envelope that oscillates around the zero line, as shown by curve (3) in FIG. 3, which is often undesirable and, furthermore, may last for such a long time that it may interfere with the next pulse. To prevent this oscillation and interference, additional damping is connected into and thus rendered effective in the coupling network at a predetermined time $t_{TB}$, some time after $t_p$. This additional damping is obtained by switching into the coupling network 3 a resistor $R_{TB}$, a matching transformer $T_{TB}$, and an electronic switch $S_{TB}$, as schematically shown in FIG. 4 in the "Tail Biter" circuit 5. This electronic switch may consist of well-known switching tubes, transistors, or thyristors. By choosing the value of the resistor $R_{TB}$, moreover, such that the combination coupling network 3 and antenna 4 is critically damped, the envelope of the pulse tail approaches the zero line asymptotically, as shown by curve (4) in FIG. 3.

Figure 5:
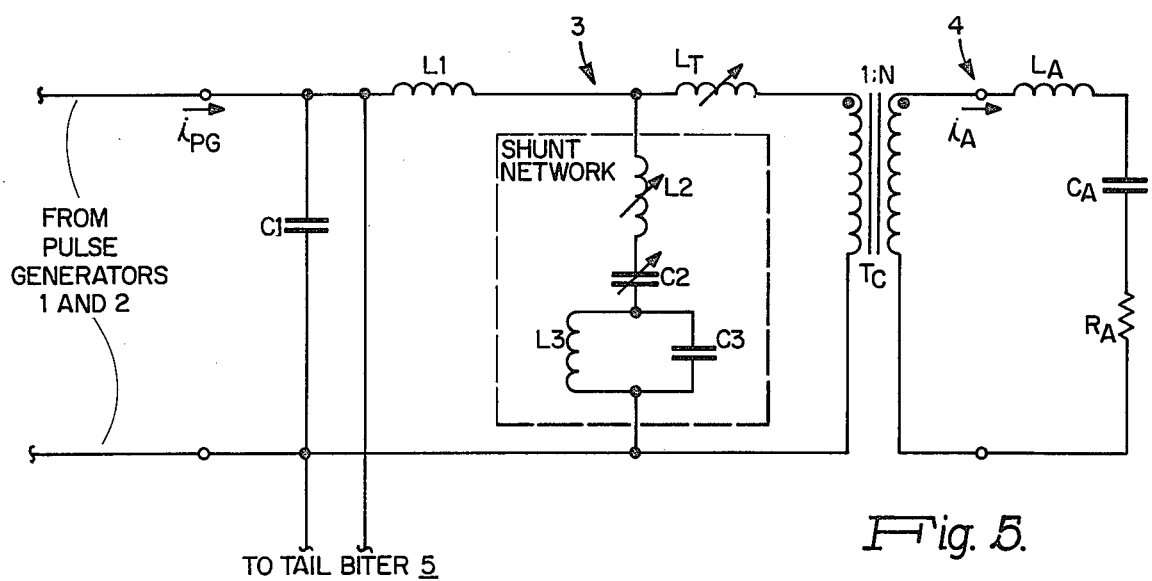
FIG. 5 is a modified multiple tuned coupling network circuit.

To obtain a different envelope shape of the pulse leading edge, a different coupling network may be used, as before stated, such as the coupling network shown in FIG. 5, consisting of capacitors $C_1$, $C_2$, and $C_3$; series inductor $L_1$ and inductors $L_2$ and $L_3$; antenna tuning series inductor $L_T$; and transformer $T_c$ coupling to the antenna 4. The parallel combination of $C_3$ and $L_3$ is tuned to the carrier frequency, but the series combination of $C_2$ and $L_2$, however, is not so tuned to the carrier frequency. These elements are indicated as variables, since they may readily be used to modify the envelope of the pulse leading edge. Since the objective of the transmitting system is to generate an RF pulse with a prescribed envelope shape, the element values of the coupling network 3 are chosen such that the highest resonant frequency of the network transfer function (relation between input pulse generator current and antenna current) is equal to the desired RF frequency. Another condition that must be satisfied is that all of the energy initially stored in the coupling network 3 (this energy is primarily stored in the coupling capacitor $C_1$ and inductor $L_1$ since very little energy is transferred to the antenna during the first RF cycle) is transferred to the antenna 4. This condition is satisfied, if $$(1) \quad \frac{1}{N^2} C_1 = C_A$$

and $$(2) \quad N^2 L_1 = N^2 L_T + L_A.$$

For the purpose of explaining the operation of the circuit of FIG. 5, it is convenient to consider it as two resonant circuits coupled together by a reactive shunt network. The first resonant circuit comprises $C_1$ and $L_1$, and the second resonant circuit comprises $L_T$, $L_A$, $C_A$ and $R_A$. The reactive shunt network comprises $L_2$, $C_2$, $L_3$ and $C_3$. In general, however, this shunt network may have any number of reactive and resistive elements. It is evident that with the shunt network shorted out, no energy transfers between the two resonant circuits. Furthermore, if the impedance of the reactive network at the RF carrier frequency is small compared to the elements in the resonant circuit, then the rate of energy transfer between the two resonant circuits will be slow—so-called weak coupling. Thus, the time-to-peak $t_p$ of the antenna current (FIG. 3) will primarily depend upon the value of the shunt network impedance at the carrier frequency.

Such shunt network may consist of only one element, a capacitor or an inductor. A capacitor is preferred because it tends to filter out harmonics in the pulse generator output current. To demonstrate the kind of envelope shape that can be obtained with different types of shunt networks, it has been found that a parallel LC network tuned to the carrier frequency will produce a resultant curve very close to a cosine-wave. Indeed, if no losses are present in the circuit, this curve would be a true cosine-wave. Adding a small inductance in series with such a parallel tuned network, however, results in an envelope that starts to deviate from a cosine-wave and approaches a sine-wave as the impedance of the series inductance element is increased and the impedance of the parallel tuned elements are decreased. With a single inductor for the shunt network or a single capacitor, on the other hand, envelope curves are obtained that are close to a sine-wave.

Figure 6:
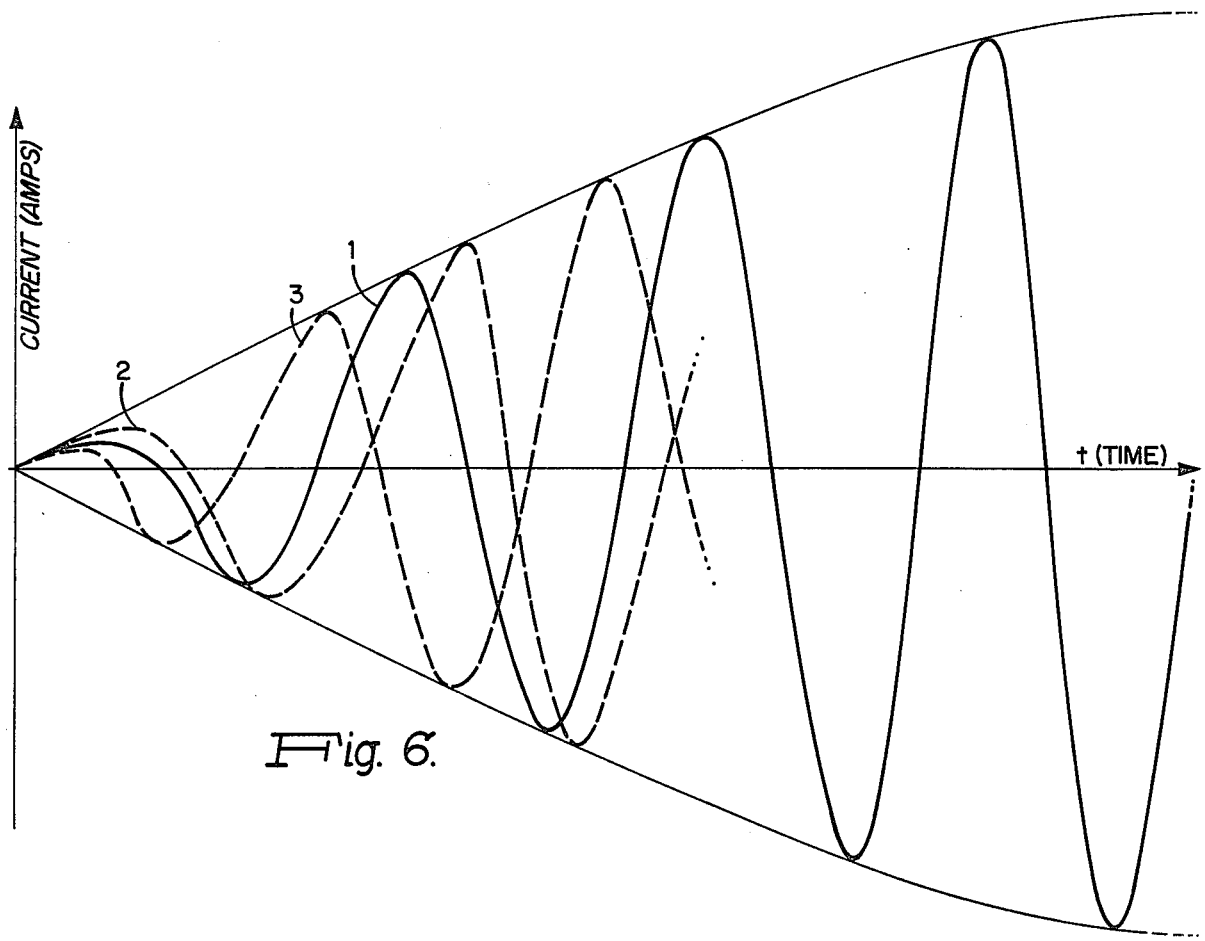
FIGS. 3 and 6 are further waveforms illustrating the envelope of the antenna current pulse producable with the embodiment of FIG. 1.

For purposes of comparing the envelope shapes obtained with such four different shunt networks with typical desired envelope shapes, the before-discussed curves (2) and (3) are presented in FIG. 6 with the envelope shape $$t^c e^{-\alpha t}$$

for $c$ equal to 1.5 and $c$ equal to 2. As discussed for the single tuned coupling network 3 of FIG. 4, it is desirable to maintain uniformly spaced zero-crossings of the RF carrier. In general, phase-modulation will result using the type of coupling network 3 shown in FIG. 5; but, by modifying the pulse generator currents, phase modulation can be avoided. For example, the parallel tuned network before discussed will give rise to phase modulation of the type shown by curve (2) in FIG. 6, if the coupling networks are driven by one sine-wave of current whose frequency is equal to the RF carrier frequency. This phase modulation can be prevented by increasing the frequency of the pulse generator output current. With a purely inductive coupling network, however, no phase modulation is obtained when using an input current sine-wave of the same frequency as the RF carrier.

In some applications, furthermore, it is desirable to have a system with adjustable pulse leading edge envelope. This adjustment may be referred to as envelope timing adjustment (ETA); and, in accordance with the present invention, can easily be accomplished, for example by using the before-mentioned shunt network with series inductor $L_2$ in which the series inductor is made adjustable.

The invention has been successfully applied to a practical Loran C transmitter operating with standard Loran C pulse shape and repetition rate selection. The pulse generator circuits 1 and 2 were generally of the magnetic compression type as described, for example, in copending application Ser. No. 171,174, filed on or about Aug. 12, 1971. The antenna output current processor 7 was of the hard limiting type (see, for example, hard limiting Loran-C receiver manuals), and the multiplexed digital computer 8 was of the PD P11 type with the pulse control interface 9 being standard TTL line drivers and line receivers type circuit. The antenna 4 was tuned by a tuner 6 of the variometer type. Clearly other types of similar well-known circuit components may be similarly employed.

While the invention has been described for the above-mentioned preferred applications as operating with the opposite polarity half-cycles of pulse generators 1 and 2 employed substantially contiguously, giving steep leading-edge antenna or other load current, there are applications where the opposite polarity half-cycle may be caused to occur, for example, a number of even half-cycles later to produce a complete cycle, giving rise to a more gradual rise time envelope, where desired. Further modifications will also occur to those skilled in this art, and all such are considered to fall within the spirit and scope of the invention as defined in the appended claims.

What is claimed is:

1. A method of generating radio-frequency pulses of predetermined pulse shape, that comprises, generating one of a positive and negative half-cycle of radio-frequency current, generating the opposite half-cycle of such radio-frequency current, adjusting the timing of such generating and combining said half-cycles to produce a resultant complete cycle of said radio-frequency, applying said complete cycle to impulse-excite a network coupled to a load, and adjusting the network and load to provide a resultant transfer function characteristic yielding upon excitation by a cycle of said radio-frequency current a load pulse of substantially the predetermined pulse shape, the said complete cycle controlling the first half cycles of the leading edge of the load pulse current and the said network and load characteristic controlling the remaining half cycles thereof.

2. A method as claimed in claim 1 and in which said timing is varied to produce phase-coding of successive pulses.

3. A method as claimed in claim 1 and in which continued oscillation of said pulse is prevented by critically damping said network and load at a time after the occurrence of the time required to peak said pulse.

4. A method as claimed in claim 1 and in which said load comprises an antenna circuit and the coupling network comprises a tuned circuit, and the further step is performed of tuning each of said circuits to said radio frequency.

5. A method as claimed in claim 4 and in which said pulses are Loran-type pulses with said generating steps being effected in groups of a plurality of pulses, with each group being phase-coded.

6. A method as claimed in claim 5 and in which a typical phase code is selected as $+\pm-\overset{+}{\mp}+\mp+\mp\pm$, where + indicates zero degree radio-frequency carrier phase, − indicates 180° carrier phase, and $\pm$ and $\mp$ indicates that the pulses alternate in phase between + and − and between − and + from group to group.

7. A method as claimed in claim 5 and in which a typical phase code is selected comprising two groups of pulses as follows:

+ + − − + − + − +, and

+ − − + + + + −, where + indicates zero degree radio-frequency carrier phase and - indicates 180° carrier phase.

8. A radio-frequency pulse generating system for producing pulses of predetermined pulse shape and having, in combination, a pair of similar radio-frequency pulse generator means each adjusted to produce a half-cycle only of radio-frequency current of opposite polarity to that of the other; means for controlling the timing of said generator means to produce a resultant complete cycle of radio-frequency current; coupling network means connected to each of the pulse generator means; a load connected to the network means; and means for adjusting the coupling network means and load to provide a resultant transfer function characteristic thereof yielding, upon impulse excitation by said complete cycle of said radio-frequency current from said pair of generator means, a pulse in said load of substantially said predetermined pulse shape, wherein the said complete cycle controls the first half cycles of the leading edge of the load pulse current and the said network and load characteristic controls the remaining half cycles thereof.

9. A radio-frequency pulse generating system as claimed in claim 8 and in which means is provided for changing the relative timing of half cycles generated by the pair of pulse generator means to phase-code said pulses.

10. A radio-frequency pulse generating system as claimed in claim 9 and in which means is provided for controlling said pulse generator means to produce groups of pluralities of pulses, each group being phase-coded.

11. A radio-frequency pulse generating system as claimed in claim 8 and in which there is provided means for critically damping said network means and load, and switching means for controlling the damping means to render the same effective at a time after the occurrence of the time required to peak said pulse.

12. A radio-frequency pulse generating system as claimed in claim 8 and in which load comprises an antenna circuit and said coupling network means comprises a tuned circuit, said circuits being tuned to said radio frequency.

13. A radio-frequency pulse generating system as claimed in claim 12 and in which said coupling network means is multiply tuned, further comprising circuit elements tuned to a frequency other than said radio frequency to modify the leading edge of said pulse.

14. A radio-frequency generating system as claimed in claim 8 and in which the coupling network means comprises a shunt-connected network, the impedance of which is adjusted to control the time required to peak said pulse.

15. A radio-frequency generating system as claimed in claim 14 and in which said shunt-connected network comprises at least one of (1) parallel capacitance-inductance tuned to said radio-frequency to provide a predetermined substantially cosine-wave pulse shape, (2) said parallel capacitance-inductance connected with series inductance to modify said cosine-wave pulse shape to approach a sine-wave shape, (3) substantially only capacitance further to filter out harmonics from said pulse generator means, and (4) substantially only inductance, the substantially only capacitance and only inductance producing pulse shapes closer to a sine-wave.

16. A radio-frequency generating system as claimed in claim 15 and in which means is provided for phase-coding said groups of pulses.

17. A radio-frequency generating system as claimed in claim 16 and in which said controlling means comprises antenna output current processor means connected to sample the output of said antenna means and to reference timing and amplitude means, time-multiplexed computer controlling means connected to said processor means and feeding pulse control means in turn connected with the pair of pulse generator means to interface with and control the same.

18. A radio-frequency generating system as claimed in claim 17 and in which said pulse control means is also connected with antenna tuner means for controlling the tuning of said antenna means.

19. A radio-frequency generating system as claimed in claim 17 and in which there is provided means for critically damping said network means and antenna load, and switching means for rendering the damping means effective at a time after the occurrence of the time required to peak said pulse.

20. A radio-frequency generating system as claimed in claim 8 and in which means is provided for controlling the amplitude of successive half-cycles of radio-frequency current to vary the envelope of the said leading edge.

* * * * *